United States Patent
Ramaswamy et al.

(10) Patent No.: US 10,789,410 B1
(45) Date of Patent: Sep. 29, 2020

(54) IDENTIFICATION OF SOURCE LANGUAGES FOR TERMS

(71) Applicant: Amazon Technologies, Inc., Seattle, WA (US)

(72) Inventors: Sriraghavendra Ramaswamy, Chennai (IN); Gururaj Narayanan, Bangalore (IN); Kalidas Yeturu, Tirupati (IN); Nilesh Mahadeo Sah, Vadodara (IN)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 15/633,463

(22) Filed: Jun. 26, 2017

(51) Int. Cl.
| | | |
|---|---|---|
| G06F 17/27 | (2006.01) | |
| G06F 17/28 | (2006.01) | |
| G06F 17/20 | (2006.01) | |
| G06F 40/10 | (2020.01) | |
| G06F 40/58 | (2020.01) | |
| G06F 40/232 | (2020.01) | |
| G06F 40/268 | (2020.01) | |
| G06F 17/00 | (2019.01) | |

(52) U.S. Cl.
CPC ............ *G06F 40/10* (2020.01); *G06F 40/232* (2020.01); *G06F 40/268* (2020.01); *G06F 40/58* (2020.01); *G06F 17/00* (2013.01)

(58) Field of Classification Search
CPC ...... G06F 17/273; G06F 17/275; G06F 17/21; G06F 16/90344
See application file for complete search history.

(56) References Cited

U.S. PATENT DOCUMENTS

| | | | | |
|---|---|---|---|---|
| 5,062,143 A * | 10/1991 | Schmitt | ........ | G06F 17/275 382/228 |
| 6,167,369 A * | 12/2000 | Schulze | ........ | G06F 17/275 704/10 |
| 6,272,456 B1* | 8/2001 | de Campos | ........ | G06F 17/275 704/8 |
| 6,292,772 B1* | 9/2001 | Kantrowitz | ........ | G06F 17/275 382/230 |
| 9,037,967 B1* | 5/2015 | Al-Jefri | ........ | G06F 40/232 715/257 |
| 2006/0184357 A1* | 8/2006 | Ramsey | ........ | G06F 17/275 704/9 |
| 2006/0229865 A1* | 10/2006 | Carlgren | ........ | G06F 17/275 704/8 |

(Continued)

OTHER PUBLICATIONS

Gupta et al, "Machine learning approach for language identification & transliteration", 2014, In Proceedings of the Forum for Information Retrieval Evaluation (pp. 1-5).*

*Primary Examiner* — Olujimi A Adesanya
(74) *Attorney, Agent, or Firm* — Lee & Hayes, P.C.

(57) ABSTRACT

To prevent typos in electronic documents, quality checks are performed to identify portions of the document that have been misspelled. Major sources of false positives are words that have been transliterated from other languages into English. The quality control system described herein identifies transliterated words in electronic documents. The system may be trained to evaluate a set of words, and determine likelihoods that individual words in the set of words are transliterated (i.e., they are not native to the language and/or alphabet of the electronic document). In some embodiments, the model may be further configured to identify a language and/or alphabet that the individual word was transliterated from.

20 Claims, 6 Drawing Sheets

(56) References Cited

U.S. PATENT DOCUMENTS

| | | | |
|---|---|---|---|
| 2007/0156404 A1* | 7/2007 | Lee | G10L 13/08 704/254 |
| 2009/0083028 A1* | 3/2009 | Davtchev | G06F 17/273 704/9 |
| 2009/0144049 A1* | 6/2009 | Haddad | G06F 17/2223 704/3 |
| 2009/0307584 A1* | 12/2009 | Davidson | G06F 17/273 715/257 |
| 2010/0094614 A1* | 4/2010 | Bilac | G06F 17/2863 704/2 |
| 2010/0228729 A1* | 9/2010 | Asonov | G06F 40/232 707/730 |
| 2010/0286979 A1* | 11/2010 | Zangvil | G06F 17/273 704/9 |
| 2012/0278302 A1* | 11/2012 | Choudhury | G06F 16/951 707/709 |
| 2013/0283156 A1* | 10/2013 | Al Badrashiny | G06F 40/232 715/257 |
| 2014/0267047 A1* | 9/2014 | Paddon | G06F 3/0237 345/168 |
| 2015/0088487 A1* | 3/2015 | Yang | G06F 17/2863 704/3 |
| 2016/0179774 A1* | 6/2016 | McAteer | G06F 17/273 704/9 |
| 2016/0357728 A1* | 12/2016 | Bellegarda | G06F 17/275 |
| 2018/0032499 A1* | 2/2018 | Hampson | G06F 40/253 |
| 2019/0034543 A1* | 1/2019 | Ho | G06F 16/9535 |

\* cited by examiner

IDENTIFICATION OF SOURCE LANGUAGES FOR TERMS

BACKGROUND

Despite the existence of spellchecking software, typographical errors ("typos") made by an author, an editor, a publisher, etc. continue to exist with respect to electronic books (eBooks). To prevent these issues, quality checks are performed on electronic documents to identify portions of the document that have been misspelled, misconverted (i.e., an optical recognition system misidentified a letter in a scan of a physical document), or which are otherwise incorrect. As these types of quality checks must be performed on hundreds of thousands of English eBooks per week, time constraints necessitate that the systems that perform the quality checks must be at least partially automated.

However, despite using a relatively large lexicon of known words and various types of heuristics, current systems tend to identify many words/terms that are believed to be typos/misspellings, but end up being false positives (i.e., words that are not typos). One of the major sources of false positives is words from other languages that have been transliterated into the English language.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
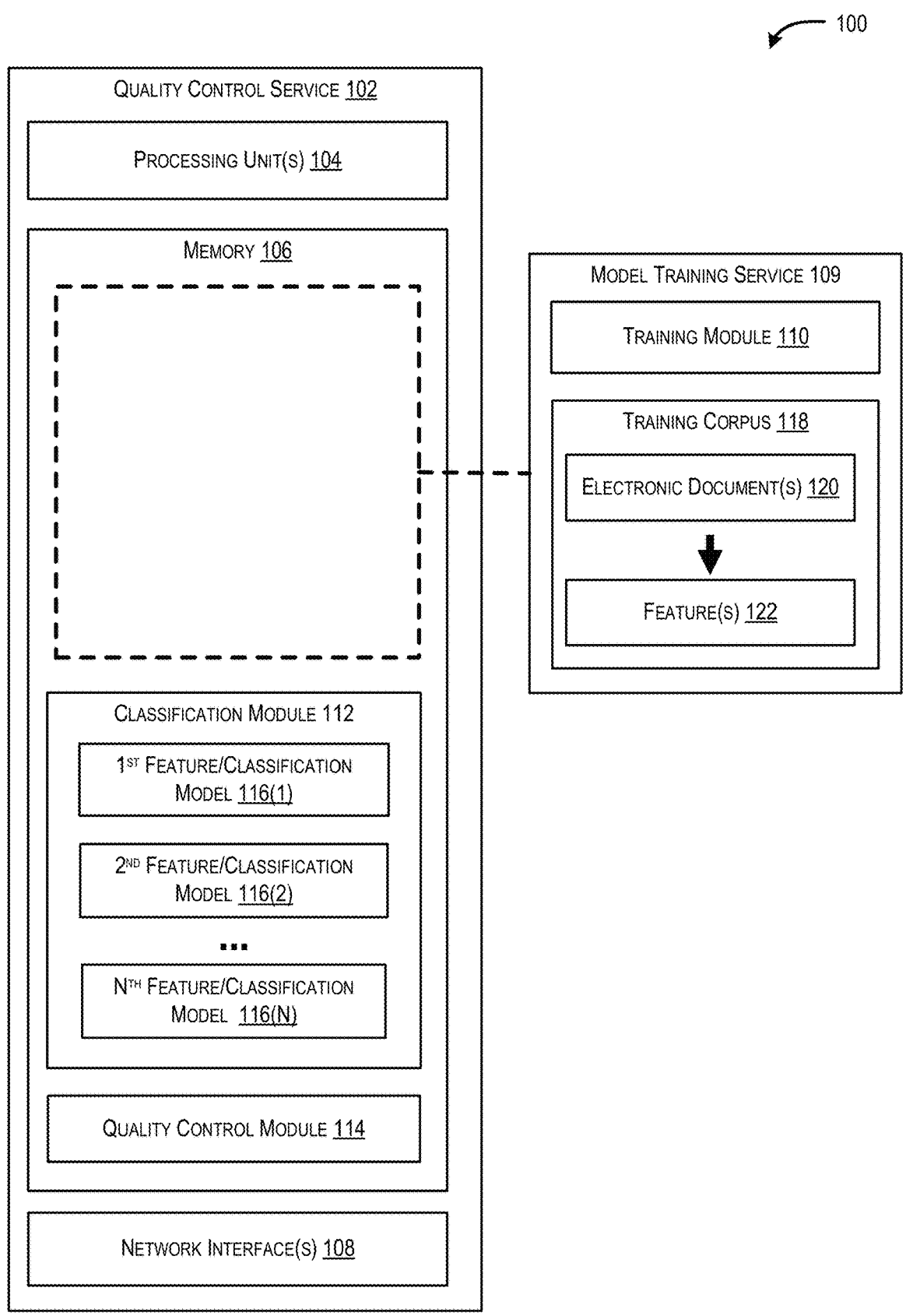
FIG. 1 is an illustrative computing architecture of a quality control service that identifies transliterated words in an electronic document.

This disclosure is generally directed to an automated system for identifying transliterated and/or transcribed words in an electronic document (collectively referred to herein as "transliterated word(s)"). The system may be trained to evaluate a set of words, and determine likelihoods that individual words in the set of words are transliterated (i.e., they are not native to the language and/or alphabet of the electronic document). In some embodiments, the model may be further configured to identify a language and/or alphabet that the individual word was transliterated from.

A transliterated word or term is a word that (i) traditionally occurs in a particular language or which is normally spelled using a particular alphabet, and that (ii) has been converted and/or spelled out using a different alphabet or in a different language. An example of a transliterated word is "gorakhanathi," which is a transliteration of a Sanskrit term for the sect of yogis that follow the Nath Hindu monastic movement founded by Guru Horakhnath. Since there is not a corresponding English term for this sect, the Sanskrit term is transliterated using letters of the Latin alphabet as "gorakhanathi." Moreover, a transcribed word may refer to a word/term that is converted to a different form, such as a word/term that is converted from a first representation (e.g., speech) to a second, different representation (e.g., text). For the purposes of this discussion, an electronic document may include any digital body of text, including eBooks, electronic magazines, blog posts, microblog entries, SMS messages, webpage texts, emails, as well as other examples of a digital body of script.

The automated system described herein first accesses a set of one or more words. These words may be generated by the system, received from another computing system, or may be input into the system by a user. In some embodiments, the set of words may correspond to a list of potential typos identified by a quality control system during an evaluation of an electronic document. The quality control system may then compare the set of words to a lexicon of known words, and/or apply one or more heuristics to identify and remove valid words/portions of texts that were incorrectly flagged as potential typos (e.g., a function derived via machine learning that is designed to identify false positives). For example, the quality control system may apply one or more rules to identify whether a word corresponds to a proper noun.

The system may then apply one or more classifiers to the set of words to identify transliterated words. In some embodiments, one of the classifiers may be a linear, binary classifier that is able to determine a likelihood that a word is of a language. For example, a classifier may be trained to break an input word into its corresponding n-grams, and then determine based on the n-grams of the input word whether the word is an English/Latin word, or whether the word has been transliterated from a different language/alphabet. An "n-gram" is a contiguous sequence of "n" items from a given sequence of text. For example, an n-gram of size 1 is a unigram (e.g., the unigrams of the word "green" are "g," "r," "e," "e," and "n"), an n-gram of size 2 is a bigram (e.g., the bigrams of the word "green" are "gr," "re," "ee," and "en"), an n-gram of size 3 is a trigram (e.g., the trigrams of the word "green" are "gre," "ree," and "een"), and so on. Alternatively or in addition, the classifier may be trained to identify a language/alphabet that the input word has been transliterated from based on the n-grams of the input word. In some embodiments, the classifiers may also output a confidence score associated with a determination of whether a word has been transliterated, and/or the language/alphabet the word has been transliterated from.

In some embodiments, the system may have trained the classifiers using one or more language models. The language models may have been built using one or more training corpuses, where individual training corpuses may correspond to one or more electronic documents of a known language/alphabet (e.g., one or more of dictionaries of the corresponding language, electronic documents in the corresponding language, text from webpage(s) in the corresponding language, etc.). As part of the training, the system may break the words of the document into their corresponding n-grams. For example, where an Arabic dictionary is used to train the system, the system may break the word "eftar" (i.e., the Arabic term for a huge feast enjoyed during Ramazan) into the corresponding trigrams of "_ef," "eft," "fta," "tar,"

and "ar_." The system may then treat each distinct character n-gram of a word as a feature of the word.

The system may then perform an analysis of the features of words in a training corpus to identify feature characteristics of the corresponding language of the training corpus. In some embodiments, the system may be configured to consider only n-grams that appear in at least a threshold number of different words in the training corpus in its analysis. The system may then build a feature model for the corresponding language. The feature model may identify characteristics of the language, such as a distribution of n-grams across the language, associations between n-grams in the language, feature patterns occurring in the language, etc. For example, the model may determine a frequency that the trigram "fta" is present in Arabic, and may determine a frequency that the trigram "fta" is associated with "tar" (e.g., how often are they present in the same word, at what frequency do they follow one another, etc.). The system may then perform similar evaluations for one or more other training corpuses that correspond to other languages. Based on the evaluations of each of the languages, the system may then build feature models for each of the languages.

The system may then train the classifiers using the feature models so that the classifiers are able to use the feature characteristics identified by the models to identify whether a word is a transliterated word and/or what language/alphabet the word was transliterated from.

The techniques, apparatuses, and systems described herein may be implemented in a number of ways. Example implementations are provided below with reference to the following figures.

FIG. 1 is an illustrative computing architecture 100 quality control service that identifies transliterated words in an electronic document. The computing architecture 100 may be used to implement the various systems, devices, and techniques discussed herein. In various embodiments, the quality control service 102 can be implemented or hosted by one or more servers, server farms, data centers, or any of the other computing devices.

In the illustrated implementation, the computing architecture 100 includes one or more processing units 104 coupled to a memory 106. The computing architecture may also include a network interface 108. The quality control service 102 can include a training module 110, a classification module 112, and a quality control module 114 stored in the memory 108. FIG. 1 further illustrates the training module 110 and the training corpus 118 as being stored on a model training service 109. In some embodiments, the model training service 109 may be implemented on a separate computing device from quality control service 102. Alternatively, the model training service 109 may be stored on the memory 106 of the quality control service 102.

As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of the modules can be implemented in whole or in part by hardware (e.g., a specialized processing unit, etc.) to execute the described functions. In various implementations, the modules described herein in association with quality control service 102 can be executed across multiple devices.

In some embodiments, a training module 110 may generate one or more feature/classification models 116(1)-116(N). For example, training module 110 may generate feature/classification models 116(1)-116(N) using one or more training corpuses 118. A training corpus 118 may correspond to a collection one or more electronic documents 120 that are written in a known language/alphabet, and/or features 122 that have been transformed and/or otherwise extracted from the electronic documents 120. A feature/classification model 116 may be a computational model that uses characteristics of a corresponding language (e.g., a distribution of n-grams across the language, associations between n-grams in the language, feature patterns occurring in the language, etc.) to probabilistically determine the native language and/or alphabet of a word based on the n-grams present within the word. In some embodiments, the electronic documents 120 may include one or more electronic portions of text that are written in a particular language and/or alphabet (e.g., one or more of dictionaries of the corresponding language, electronic documents in the corresponding language, text from webpage(s) in the corresponding language, etc.). For example, for a training corpus 118 for Arabic, electronic documents 120 may include the Quran.

When generating the feature/classification models 116(1)-116(N), training module 110 may analyze the electronic documents 120. In some embodiments, the training module 110 may extract features 122 from the electronic documents 120. For example, training module 110 may break the words of an electronic document 120 into their corresponding n-grams. For example, where an Arabic dictionary is used to train the system, the system may break the Arabic word "alaikum" into the corresponding trigrams of "_al," "ala," "lai," "aik," "iku," "kum," and "um_." Training module 110 may store the n-grams of the words of the electronic document 120 in as features 122. For example, training module may treat each distinct character n-gram of a word as a feature of that word.

Training module 110 may then perform an analysis of the features 122 extracted from the electronic documents 120 to identify feature characteristics of the corresponding language of the training corpus 118. Characteristics of a language and/or alphabet corresponding to training corpus 118, may include a distribution of n-grams across the language, associations between n-grams in the language, feature patterns that are indicative of a word being of the language, etc. In some embodiments, when performing this analysis, the training module 110 may only consider only n-grams that appear in at least a threshold number of different words in the training corpus 118, n-grams that appear a threshold number of times in features 122, a preset number of the highest occurring n-grams in features 122, or a combination thereof.

Training module 110 may then build a feature/classification model 116(1) for the language corresponding to the training corpus 118 based on the characteristics of a language and/or alphabet corresponding to training corpus 118. A feature/classification model 116(1) may be an algorithmic model that probabilistically determines the native language and/or alphabet of a word based on the n-grams present within the word. For example, for a word W whose n-gram sequence is $(t_1, t_2, \ldots, t_m)$, a first potential feature/classification model 116 for determining a probability of belonging to a language $L_j$ may be given by:

$$P(W \in L_j) = P(<t_1, t_2, \ldots, t_m> \in L) = P(T_{L_j}^{(1)} = t_1, T_{L_j}^{(2)} = t_2, \ldots, T_{L_j}^{(m)} = t_m) P(L_j)$$

where $T_{L_j}^{(i)}$ denotes the $i^{th}$ n-gram in the ordered sequence of n-grams occurring in a word belonging to language $L_j$ and $P(L_j)$ denotes the a-priori probability of the language $L_j$(i.e. the general/unconditional probability that a randomly given word will belong to that language). Moreover, since the number of n-gram in a word depends on the word length, which is a variable, the features may identify when an n-gram occurs at the end of a word. In some embodiments, where feature/classification model 116 assumes that the probabilities of n-grams in a word are independent of each other and that all languages are equally likely to occur, the probabilistic algorithm may correspond to:

$$MostLikelyLanguage(W) = \underset{L_j \in Profiled\_Languages}{\operatorname{argmax}} \prod_{i=1}^{m} P(T_{L_j}^{(i)} = t_i)$$

In another example, a feature/classification model 116 may comprise vector representations of n-gram characteristics for a corresponding language. In some embodiments, training module 110 may generate a feature/classification model 116 by passing features 122 for a training corpus 118 to a random forest classifier, which trains a feature/classification model 116 that includes vector representations of n-grams for a corresponding language. Some feature/classification models 116 may incorporate positive or negative correlations that individual n-grams and/or combinations of n-grams occur in a corresponding language. For example, some feature model may apply a negative weight for n-grams do not exist in some languages.

The classification module 112 can be executable by the one or more processing units 104 to determine whether a word has been transliterated from another language and/or alphabet. Alternatively or in addition, the classification module 112 may be executable to determine a language and/or alphabet that the word has been transliterated from. For example, the classification module may be able to determine that the word "datsu-sura" (i.e., a traditional Japanese dance) is a transliterated word, and/or that it has been transliterated from the Japanese language.

In some embodiments, classification module 112 may apply a classifier that is able to determine a confidence score that a word is a transliterated word from a different language and/or alphabet from the language/alphabet of a source document of the word. For example, classification module 112 may assign a confidence score that corresponds to a determined likelihood that the word is a transliterated word, and the confidence score can take the form of a numerical value, text, a symbol, one or more characters, and so on. In another example, classification module 112 may assign multiple confidence scores to a word, with individual confidence scores corresponding to a likelihood determined by classification module 112 that the word has been transliterated from a particular language/alphabet. For example, for the term "pratisamvits," classification module 112 might assign confidence scores of "0.1" for English, "0.4" for Japanese, "0.9" for Sanskrit, "0.6" for Mandarin, etc. In some embodiments, classification module 110 may only determine that a word is transliterated and/or the language the word is transliterated from when the confidence score meets or exceeds a confidence score threshold, which may correspond to a numerical value. If all confidence scores are below the confidence score threshold, the classification module 112 may determine that the word is transliterated from a language and/or alphabet that it has not been trained for.

In some embodiments, classification module 112 use one or more feature/classification models 116(1)-116(N) when determining the confidence scores. For example, a confidence score may correspond to a probability of belonging to a language ($L_j$) determined using a feature/classification model 116. In some embodiments, where classification module 112 uses a feature/classification model 116 that specifies vector representations of n-gram characteristics for a corresponding language, the confidence scores may be determined based on vector representations of the corresponding word. For example, classification module 112 may represent a word as a vectoral representation of its n-grams (e.g., a trigram representation of "elephant" would be "ele, lep, eph, pha, han, ant"), and then may use the vector representations of the n-gram characteristics for a language to determine one or more vector points for the word. Classification module 112 may then generate a confidence score that the word belongs to the corresponding language based on the one or more vector points.

The quality control module 114 can be executable by the one or more processing units 104 to determine a set of potential typos in an electronic document, and/or determine whether one or more of the potential typos is a transliterated word. After the quality control module 114 determines a set of potential typos in an electronic document, the quality control module 114 may then conduct a series of additional checks to identify false positives (i.e., words or other portions of text that are initially identified as typos, but are actually not typos) in the set of potential typos. For example, the quality control module 114 may perform a dictionary lookup to identify obscure words, may apply heuristics and/or hand-crafted rules to filter out proper nouns, quoted text, non-words (e.g., addresses), valid out-of-vocabulary words (e.g., compound words that may not be present in even the largest dictionary), terms for which spell-check is non-applicable (e.g., expressive interjections, onomatopoeia, etc.), or a combination thereof. In some embodiments, the series of additional checks may also cause the classification module 112 to evaluate the words in the set of potential typos to identify words that have been transliterated from another language and/or alphabet. The quality control module 114 may remove words that are identified as being transliterated words from the set of potential typos.

In some embodiments, after the additional is conducted, the quality control module 114 may provide the set of potential typos to an author of the electronic document, a publisher of the electronic document, a service that reviews and corrects the potential typos, or some other entity.

Those skilled in the art will appreciate that the architecture described in association with quality control service 102 is merely illustrative and is not intended to limit the scope of the present disclosure. In particular, the computing system and devices may include any combination of hardware or software that can perform the indicated functions, including computers, network devices, internet appliances, and/or other computing devices. The quality control service 102 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

The one or more processing unit(s) 104 may be configured to execute instructions, applications, or programs stored in the memory 106. In some examples, the one or more processing unit(s) 104 may include hardware processors that include, without limitation, a hardware central processing unit (CPU), a graphics processing unit (GPU), and so on. While in many instances the techniques are described herein as being performed by the one or more processing units 104, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memory 106 is an example of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device. In general, computer storage media may include computer-executable instructions that, when executed by one or more processing units, cause various functions and/or operations described herein to be performed.

Additionally, communication media includes data stored within a modulated data signal. For example, a computer media may include computer readable instructions, data structures, program modules, modulated carrier waves, other modulated transmission mechanisms, etc. However, as defined herein, computer storage media does not include communication media.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated environment 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the quality control service 102 may be transmitted to the quality control service 102 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

Additionally, the network interface 108 includes physical and/or logical interfaces for connecting the respective computing device(s) to another computing device or network. For example, the network interface 108 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Figure 2:
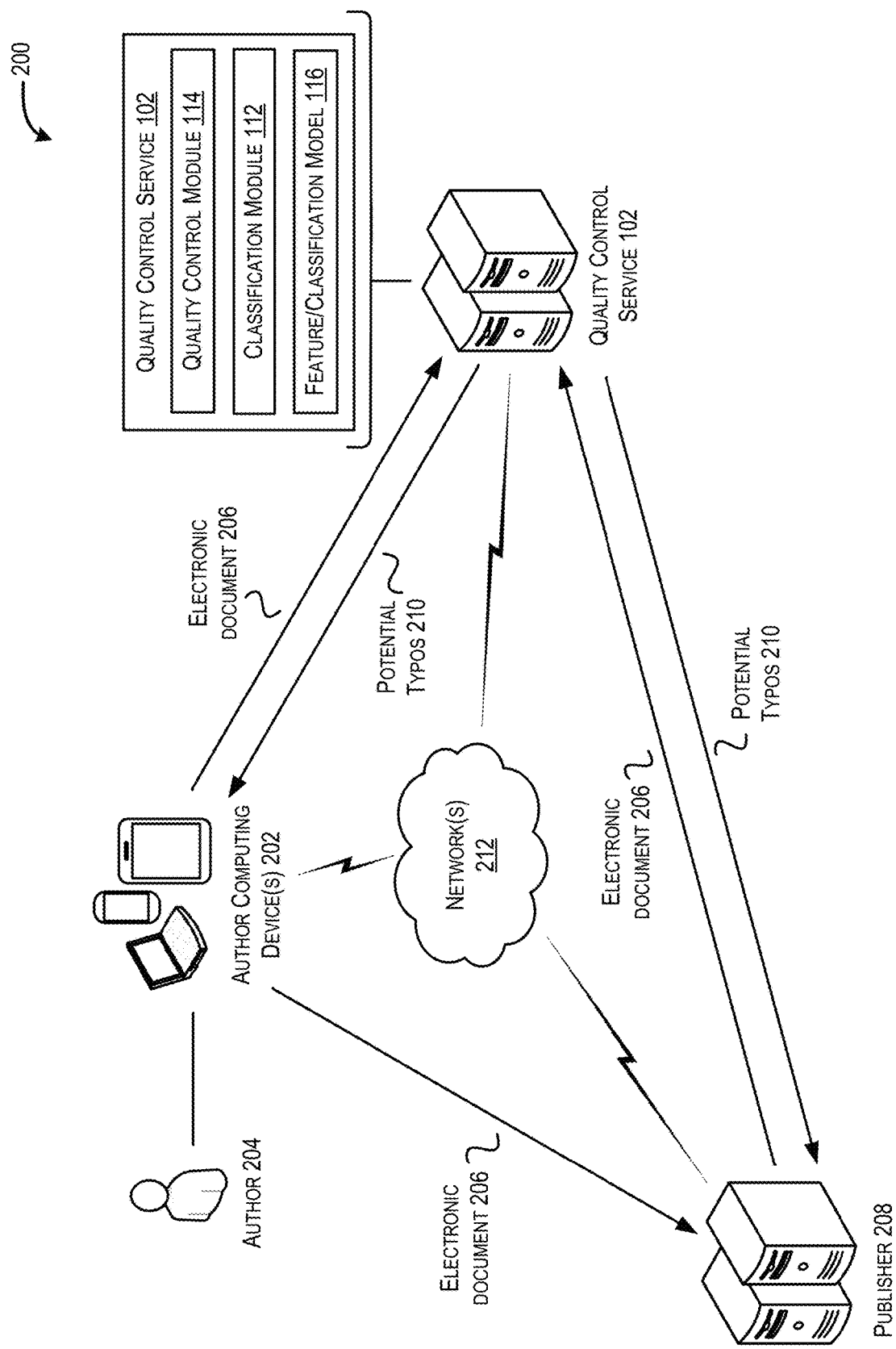
FIG. 2 is an illustrative environment for providing quality control services for identifying transliterated words in an electronic document.

FIG. 2 is a schematic diagram of an illustrative environment 200 for providing quality control services for identifying transliterated words in an electronic document.

The environment 200 may also include an author computing device 202 associated with author 204 that may provide one or more electronic documents 206 to one or more of a publisher 208 and/or the quality control service 102. The author computing device 202 may include any type of device (e.g., a laptop computer, a tablet device, a mobile telephone, etc.), and may include one or more processor(s), computer-readable media, and a display. The electronic document(s) 206 may include any digital body of text, including eBooks, electronic magazines, blog posts, microblog entries, SMS messages, webpage texts, emails, as well as other examples of a digital body of script.

The publisher 208 may be any entity, server(s), platform, etc., that offers content (e.g., products, services, etc.) for acquisition to consumers. For example, the publisher 208 may be associated with an electronic or merchant marketplace (e.g., a website, electronic application, widget, etc.) that offers electronic documents 206 and/or physical versions of electronic documents 206 to search, browse, view and/or acquire (i.e., purchase, rent, lease, borrow, etc.). The publisher 208 may provide electronic document 206 to the quality control service 102 for quality review. For example, the publisher 208 may host a website for news media and the electronic document 208 may be a news article written by the author 204. In some embodiments, the publisher 208 and the quality control service 102 may hosted by the same one or more servers, server farms, data centers, or other combination of one or more computing devices. After receiving the news article, but before publishing the news article to the website, the publisher 208 may provide the news article to the quality control service 102 to identify and/or correct typographical errors in the news article.

The quality control service 102 can be implemented or hosted by one or more servers, server farms, data centers, or any combination of one or more computing devices. The quality control service 102 may include the quality control module 114 that is configured to determine a set of potential typos in the electronic document 206 and/or determine whether one or more of the potential typos are a transliterated word. The quality control module 114 may compare the set of potential typos to a lexicon of known words, and/or apply one or more heuristics to identify and remove valid words/portions of texts that were incorrectly flagged as potential typos.

The quality control service 102 may also include the classification module 112 that is configured to determine, using the feature/classification model 116, whether a word in the set of potential typos is a word that has been transliterated from another language and/or alphabet. Alternatively or in addition, the classification module 112 may use the feature/classification model 116 to determine a language and/or alphabet that the word has been transliterated from. For example, the classification module 112 may be able to determine that the word "Laba" (i.e., a Chinese term for a type of congee traditionally eaten during the celebration of the day Buddha attaining enlightenment) is a transliterated word, and/or that it has been transliterated from the Chinese language. The feature model/classification 116 may be an algorithmic model that probabilistically determines the native language and/or alphabet of a word based on the n-grams present within the word. Alternatively or in addition, the feature/classification model 116 may comprise vector representations of n-gram characteristics for a corresponding language.

In some embodiments, after the additional is conducted, the quality control service 102 remove transliterated words from the set of potential typos. The quality control service 102 may provide the set of potential typos to the author computing device 202, the publisher 208, or another service that reviews and corrects the potential typos, or some other entity. FIG. 2 further illustrates each of the author computing device 202, the publisher 208, and the quality control service 102 being connected to a network 212, such as a local area network or the internet.

Figure 3:
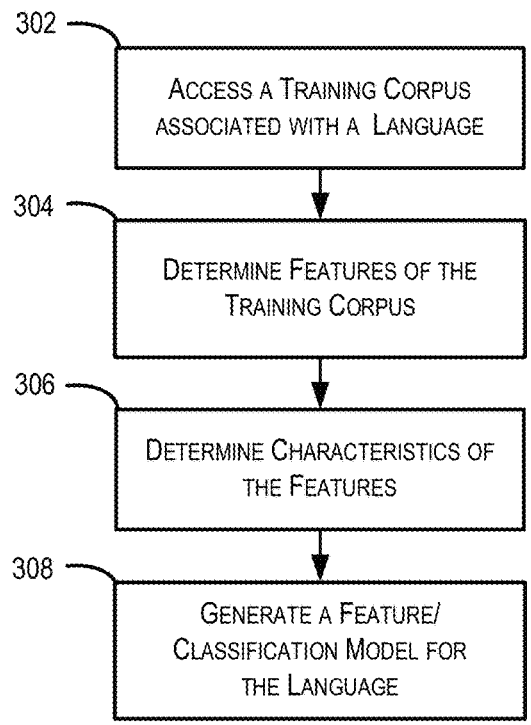
FIG. 3 is a flow diagram of an illustrative process for training a model for determining whether a word is a transliterated word from a different language.
Figure 4:
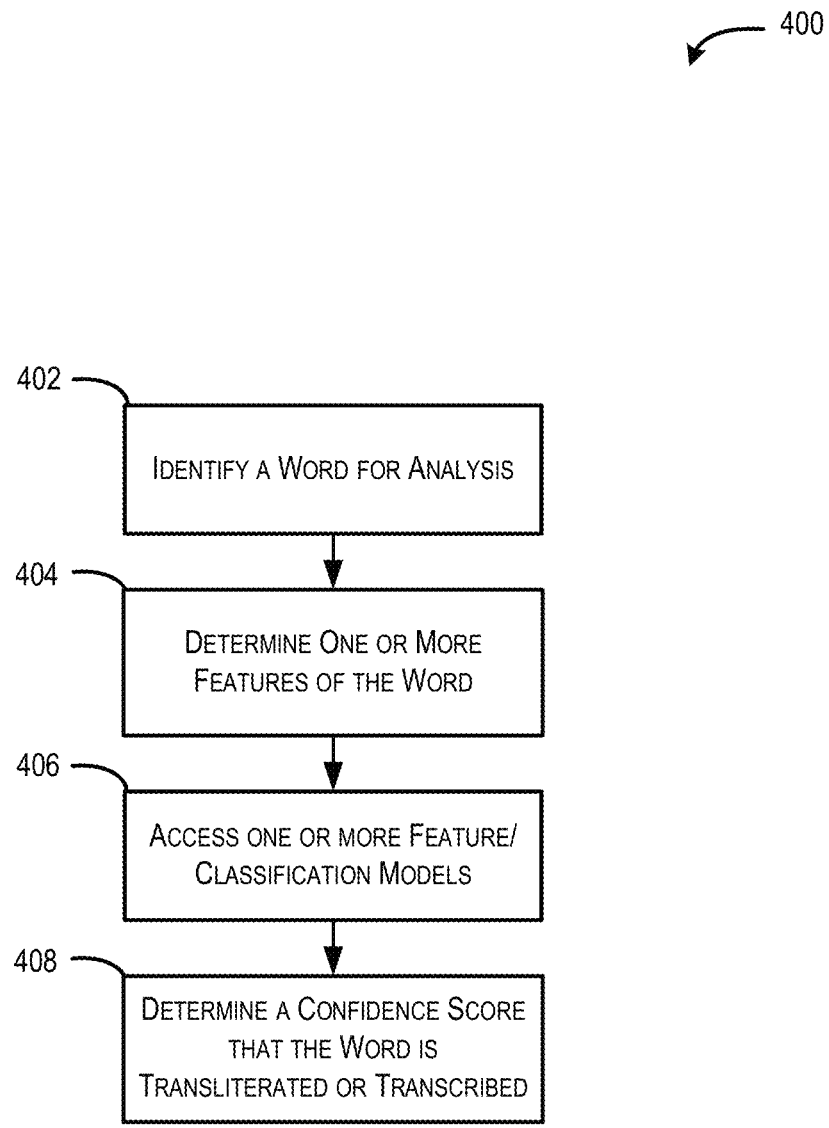
FIG. 4 is a flow diagram of an illustrative process for determining that a word is a transliterated word from a different language.
Figure 5:
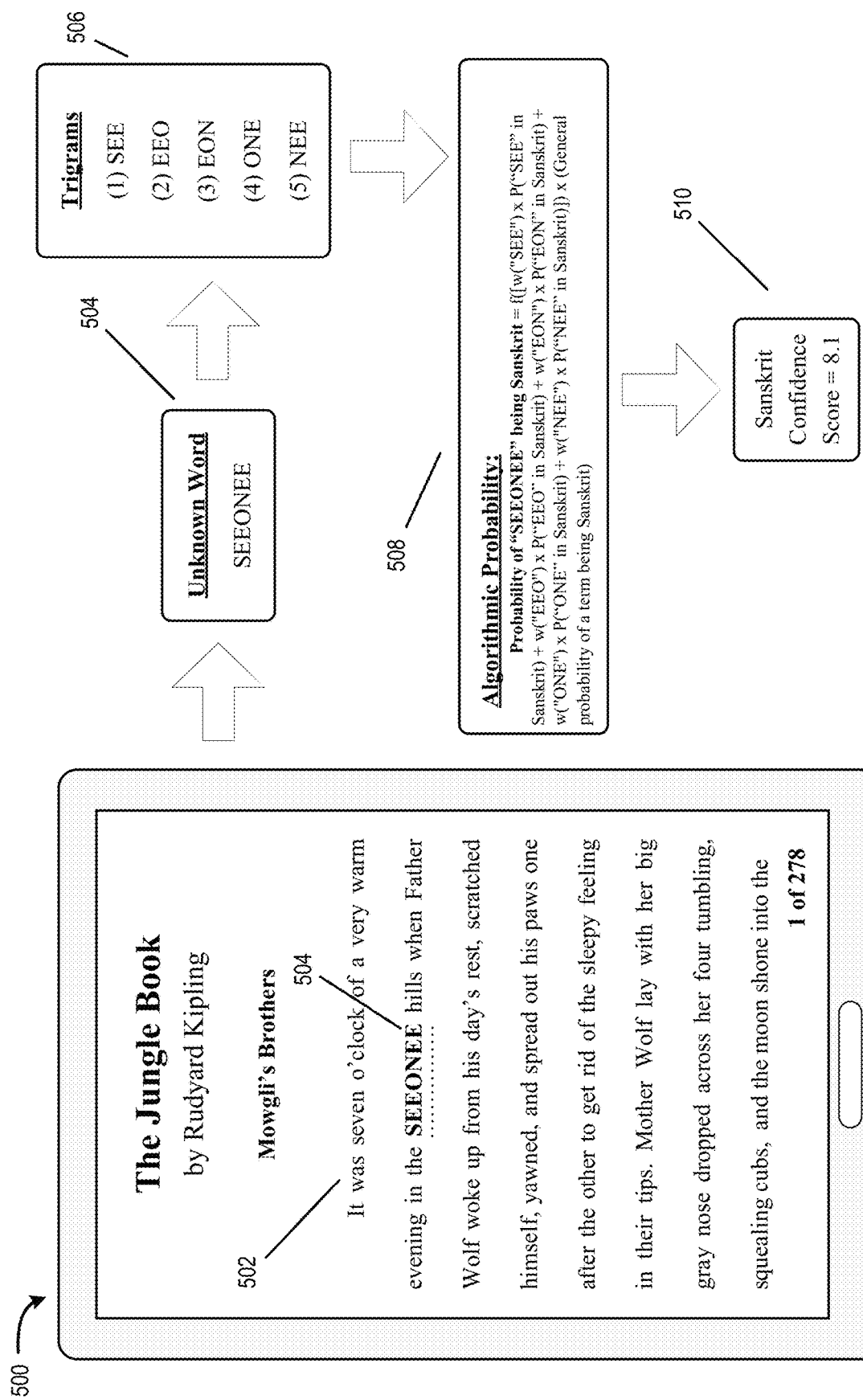
FIG. 5 is an example illustration of a process for determining that a word is a transliterated word from a different language.

FIGS. 3, 4, and 5 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 for training a model for determining whether a word is a transliterated word from a different language. The process 300 may be implemented by the computing architecture 100 and in the environment 200 described above, or in other environments and architectures.

At 302, the quality control service 102 accesses a training corpus associated with a language. In some embodiments, and as stated above, the training corpus may correspond to one or more electronic documents (i.e., one or more of dictionaries of the corresponding language, electronic documents in the corresponding language, text from webpage(s), etc.) that are written in a particular language. For example, a training corpus associated with Arabic may include electronic versions of Arabic novels and religious texts.

At 304, the quality control service 102 determines features of the training corpus. In some embodiments, determining the features may include extracting raw data from the training corpus, and then selecting from the raw data a subset of the raw data to use as features for the language. For example, the quality control service 102 may identify the n-grams in words present within the electronic documents of the training corpus, and may select some or all of the identified n-grams to be used as features for the language. For example, where the electronic document is the Quran, the quality control service 102 may identify the trigrams of "_al," "ala," "lai," "aik," "iku," "kum," and "um_," as being present within the Arabic word "alaikum." In some embodiments, the quality control service 102 may store each distinct character n-gram of a word as a feature of that word. The quality control service 102 may also store associations between the n-grams of the words of the electronic documents.

At 306, the quality control service 102 determines characteristics of the features. In some embodiments, the quality control service 102 may perform an analysis of the features of the training corpus to identify feature characteristics in relation to the language corresponding to the training corpus. For example, quality control service 102 may determine characteristics of the features that are correlated with the language corresponding to the training corpus, and/or how strongly these characteristics are correlated with the language corresponding to the training corpus. The characteristics of the features of the language may include a distribution of n-grams across the language, associations between n-grams in the language, feature patterns occurring in the language, etc. In some embodiments, when performing this analysis, the quality control service 102 may consider a previously selected set of n-grams, all possible n-grams, only the n-grams occurring in words of the electronic documents in the training corpus, only n-grams that appear in at least a threshold number of different words of the electronic documents in the training corpus, only n-grams that appear a threshold number of times the electronic documents of the training corpus, a preset number of the highest occurring n-grams in the electronic documents in the training corpus, or a combination thereof.

At 308, the quality control service 102 generates a feature/classification model for the language. For example, the quality control service 102 may build a feature/classification model for a language corresponding to the training corpus based on the characteristics of the features. The feature/classification model may to determine, based on the n-grams within an input word, a confidence score that the input word is a transliterated word, and/or a confidence score that indicates likelihoods that the input word is a transliterated word of the language corresponding to the language corpus. Alternatively or in addition, the feature/classification models may include a vector embedding of the characteristics of the features. In some embodiments, the vector embedding may be used to translate the n-grams within an input word into one or more vector points. A random forest classifier can then be used to determine one or more confidence scores that indicate likelihoods that the input word is a transliterated word, and/or is a transliterated word of the language corresponding to the language corpus.

In some embodiments, the feature models may incorporate positive or negative correlations that individual n-grams and/or combinations of n-grams occur in a corresponding language. For example, some feature model may apply a negative weight for n-grams that do not exist in some languages.

FIG. 4 is a flow diagram of an illustrative process 400 for determining that a word is a transliterated word from a different language. The process 400 may be implemented by the computing architecture 100 and in the environment 200 described above, or in other environments and architectures.

At 402, the quality control service 102 identifies a word for analysis. In some embodiments, the quality control service 102 may identify the word from a set of potential typos in an electronic document. The quality control service 102 may receive the set of potential typos, or may execute spellcheck functionality on one or more electronic documents to determine the set of potential typos. In some embodiments, before identifying a word for analysis, the quality control service 102 may additional the set of potential typos to identify false positives (i.e., words or other portions of text that are actually not typos). For example, the quality control service 102 may perform a dictionary lookup to identify obscure words, apply heuristics and/or hand-crafted rules to filter out proper nouns, quoted text, non-words (e.g., addresses), valid out-of-vocabulary words (e.g., compound words that may not be present in even the largest dictionary), terms for which spell-check is non-applicable (e.g., expressive interjections, onomatopoeia, etc.), or a combination thereof.

At 404, the quality control service 102 determines one or more features of the word. For example, the quality control service 102 may break the word into its corresponding n-grams. For example, when determining features for the word "junmin" into the corresponding trigrams of "_ju," "jum," "unm," "nmi," "min," and "in_." In some embodiments, the quality control service 102 may include a space before the word and after the word when identifying n-grams to capture whether an n-gram begins or ends a word. The quality control service 102 may then treat each distinct character n-gram of a word as a feature of the word. Additional features determined by the quality control service 102 may include the location of a particular n-gram within a word, whether a particular n-gram starts or ends the word, n-grams that precede or follow a particular n-gram, etc.

At 406, the quality control service 102 accesses one or more feature/classification models. Individual feature models may identify characteristics of a corresponding language. Characteristics identifies by a feature/classification model may include one or more of a distribution of n-grams across a corresponding language, associations between n-grams in the corresponding language, frequencies of n-gram patterns that occur in the corresponding language, etc. For example, the model may determine a frequency that the trigram "psh" is present in Sanskrit, and may determine a frequency that the trigram "psh" is associated with "sha" (e.g., how often are they present in the same word, at what frequency do they follow one another, etc.). In some embodiments, a feature model may incorporate positive or negative correlations between individual n-grams and/or combinations of n-grams and the corresponding language. For example, some feature/classification models may apply a negative weight to n-grams that do not exist in the language to which the feature model corresponds.

At 408, the quality control service 102 determines a confidence score that the word is transliterated. In some embodiments, the quality control service 102 may assign a first confidence score that indicates a first likelihood that the word is a transliterated word, and a second confidence score that indicates a second likelihood that the word has been transliterated from a particular language. Alternatively or in addition, the quality control service 102 may determine multiple confidence scores, where individual confidence scores indicate a determined likelihood that the word has been transliterated from a particular language. For example, for the term "pratisamvits," the quality control service 102 might assign confidence scores of "0.1" for English, "0.4" for Japanese, "0.9" for Sanskrit, "0.6" for Mandarin, etc.

The quality control service 102 may use the one or more feature models when determining the confidence scores. In some embodiments, the quality control service 102 determines that a word is transliterated and/or that the language the word is transliterated from a particular language when a corresponding confidence score meets or exceeds a confidence score threshold. If all confidence scores are below the confidence score threshold, the quality control service 102 may determine that the word is not a transliterated word, or that the word is a transliterated word from a language that there is no corresponding feature model.

FIG. 5 is an example illustration 500 of a process for determining that a word is a transliterated or transcribed word from a different language. FIG. 5 depicts an electronic document 502. In different embodiments, electronic document 502 may include any digital body of text, including eBooks, electronic magazines, blog posts, microblog entries, SMS messages, webpage texts, emails, as well as other examples of a digital body of script. For example, FIG. 5 depicts electronic book 502 as an electronic eBook of The Jungle Book, by Rudyard Kipling. FIG. 5 further depicts an unknown word 504 within the electronic document 502. For example, the quality control service 102 may not recognize the word "Seeonee" as a valid word, and may flag the word as a potential typo.

The quality control service 102 may then perform one or more checks to determine whether the unknown word 504 flagged as a potential typo is a false positive (i.e., a valid word that has been erroneously flagged as a potential typo). For example, the quality control service 102 may perform a dictionary lookup to identify obscure words, apply heuristics and/or hand-crafted rules to filter out proper nouns, quoted text, non-words (e.g., addresses), valid out-of-vocabulary words (e.g., compound words that may not be present in even the largest dictionary), terms for which spell-check is non-applicable (e.g., expressive interjections, onomatopoeia, etc.), or a combination thereof. These checks may include determining whether the unknown word 504 is a transliterated word. When determining whether the word is a transliterated word, the quality control system 102 may break, truncate, or segment the word into its corresponding n-grams. FIG. 5 depicts the component trigrams 506 of unknown word 504. For example, the component trigrams 506 for "Seeonee" into the corresponding tri-grams of "see," "eeo," "eon," "one," and "nee." The quality control service 102 may also identify the location of each particular n-gram within unknown word 504, whether a particular n-gram starts or ends the word, n-grams that precede or follow a particular n-gram, etc.

FIG. 5 further depicts an algorithmic model 508 that probabilistically determines a probability that an unknown word 504 is a transliterated word from a language, such as the Sanskrit language. The algorithmic model 508 may determine the probability based on characteristics of a corresponding language. Characteristics of the language may include a frequency that individual n-grams a used in the language, a frequency that individual n-grams are associated with other n-grams (e.g., how often are they present in the same word, at what frequency do they follow one another, etc.). For example, FIG. 5 shows an algorithm for determining a probability of the word "Seeonee" being Sanskrit. In FIG. 5, w("EEO") corresponds to a probabilistic weight determined by the Sanskrit language classifier model for the n-gram "EEO," and f(X) represents a transformation function determined by the same language classifier model, a different language classifier model, or a combination thereof. Alternatively or in addition, in some embodiments the likelihood that the term "Seeonee" being Sanskrit may be determined using the algorithm:

$$P(\text{"SEEONEE"}) = g((W(\text{"SEE"}), W(\text{"EEO"}), W(\text{"EON"}), W(\text{"ONE"}), W(\text{"NEE"}))$$

Where P("SEEONEE") corresponds to a likelihood of "Seeonee" being Sanskrit, W("SEE") represents a model-dependent weight associated with the Sanskrit language model for the n-gram "SEE," and $g(X_1, X_2, \ldots, X_m)$ represents a transformation function of weights determined by a same language classifier model. In some embodiments, the algorithmic model 508 may incorporate positive or negative correlations between individual n-grams and/or combinations of n-grams and the corresponding language. For example, the algorithmic model 508 may apply a negative weight to n-grams that do not exist in the language corresponding to the feature model.

FIG. 5 further depicts a confidence score 510 that the unknown word 504 is transliterated from a different language, such as Sanskrit. The confidence score 510 may correspond to, or be based at least in part on, the likelihood of the unknown word 504 being of a particular language that is determined using one or more algorithmic models 508. The quality control service 102 may determine the confidence score 510 based at least in part on the algorithmic probability. In some embodiments, confidence score 510 indicates a likelihood that the unknown word 504 is a transliterated word. Alternatively or in addition, the confidence score 510 may indicate a likelihood that the word has been transliterated from a particular language, such as Sanskrit.

Figure 6:
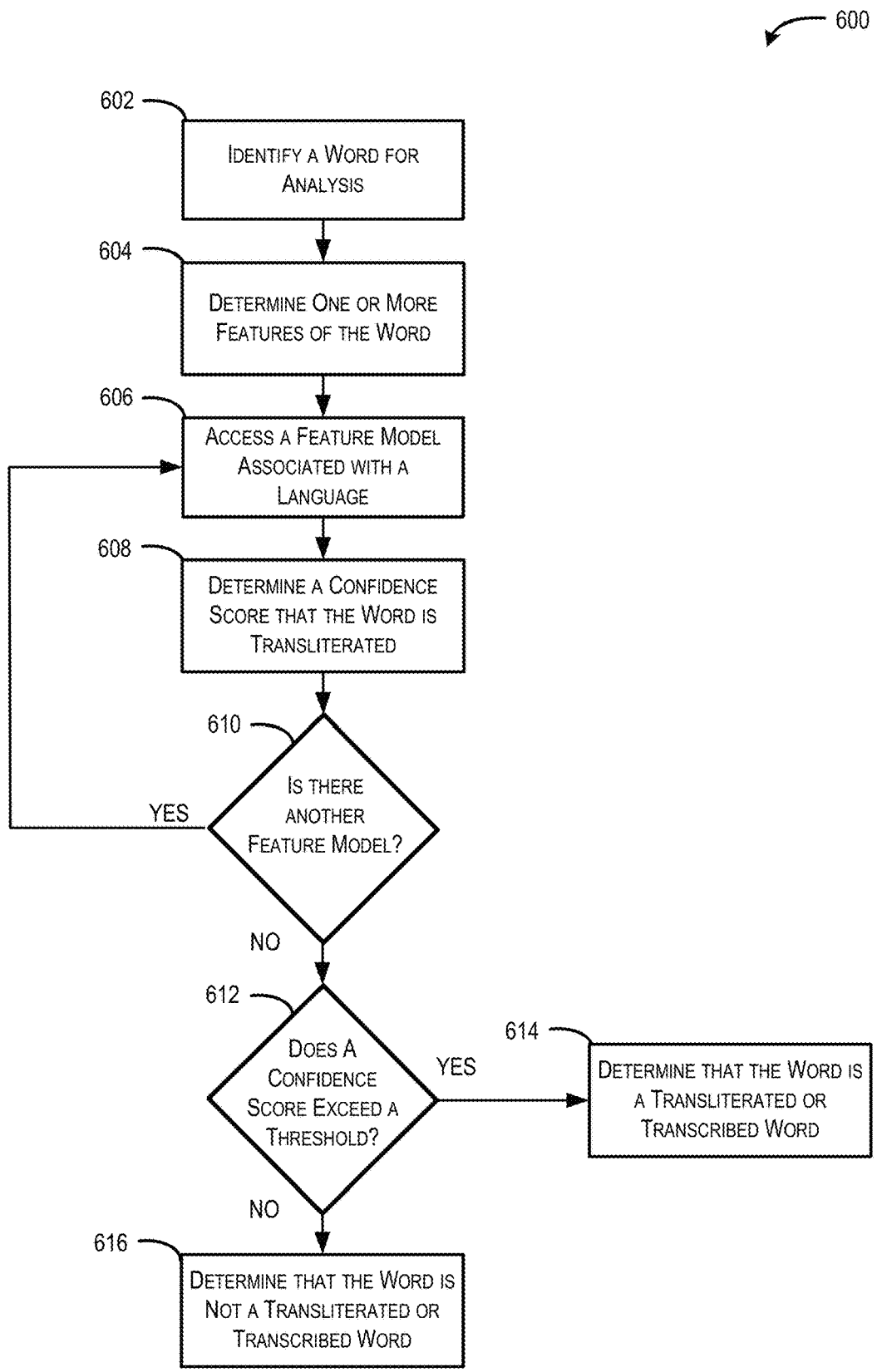
FIG. 6 is a flow diagram of an illustrative process for using more than one feature model to determine that a word is a transliterated word from a different language.

FIG. 6 is a flow diagram of an illustrative process 400 for using more than one feature models to determine that a word is a transliterated word from a different language. The process 600 may be implemented by the computing architecture 100 and in the environment 200 described above, or in other environments and architectures.

At 602, the quality control service 102 identifies a word for analysis. In some embodiments, the quality control service 102 may identify the word from a set of potential typos in an electronic document. The quality control service 102 may receive the set of potential typos, or may execute spellcheck functionality on one or more electronic documents to determine the set of potential typos. In some embodiments, before identifying a word for analysis, the quality control service 102 may additional the set of potential typos to identify false positives (i.e., words or other portions of text that are actually not typos). For example, the quality control service 102 may perform a dictionary lookup to identify obscure words, apply heuristics and/or hand-crafted rules to filter out proper nouns, quoted text, non-words (e.g., addresses), valid out-of-vocabulary words (e.g., compound words that may not be present in even the largest dictionary), terms for which spell-check is non-applicable (e.g., expressive interjections, onomatopoeia, etc.), or a combination thereof.

At 604, the quality control service 102 determines one or more features of the word. For example, the quality control service 102 may break the word into its corresponding n-grams. For example, when determining features for the word "gongzhi" into the corresponding trigrams of "gon," "ong," "ngz," "gzh," and "zhi." In some embodiments, the quality control service 102 may include a space before the word and after the word when identifying n-grams to capture whether an n-gram begins or ends a word. The quality control service 102 may then treat each distinct character n-gram of a word as a feature of the word. Additional features determined by the quality control service 102 may include the location of a particular n-gram within a word, whether a particular n-gram starts or ends the word, n-grams that precede or follow a particular n-gram, etc.

At 606, the quality control service 102 accesses a feature model associated with a corresponding language. Individual feature models may identify characteristics of a corresponding language. Characteristics identified by a feature model may include one or more of a distribution of n-grams across a corresponding language, associations between n-grams in the corresponding language, frequencies of n-gram patterns that occur in the corresponding language, etc. For example, the feature model may determine a frequency that the trigram "ngz" is present in Chinese, and may determine a frequency that the trigram "ngz" is associated with "gzh" (e.g., how often are they present in the same word, at what frequency do they follow one another, etc.). In some embodiments, the feature model may incorporate positive or negative correlations between individual n-grams and/or combinations of n-grams and the corresponding language. For example, some feature models may apply a negative weight to n-grams that do not exist in the language corresponding to the feature model.

At 608, the quality control service 102 determines a confidence score that the word is transliterated. The quality control service 102 may use the one or more feature models when determining the confidence scores. In some embodiments, the quality control service 102 may assign a first confidence score that indicates to a determined first likelihood that the word is a transliterated word, and a second confidence score that indicates a second likelihood that the word has been transliterated from a particular language.

At operation 610, the quality control service 102 determines whether there is another feature model to apply to the word. If the answer at operation 610 is "yes" (it is determined that there is another feature model to apply to the word), then the process 600 moves to an operation 608 and the quality control service 102 accesses a new feature model associated with a new language. If the answer at operation 610 is "no" (it is determined that there are no other feature models to apply to the word), then the process 600 moves to an operation 612 where the quality control service 102 determines whether a confidence score exceeds a confidence score threshold. The confidence score threshold may be a preset value, or it may be determined dynamically by the quality control service 102. In some embodiments, there may be multiple confidence score thresholds, where individual confidence score thresholds are associated with a corresponding feature model.

If the answer at operation 612 is "yes" (it is determined that there is a confidence score that exceeds the confidence score threshold), then the process 600 moves to an operation 614 and the quality control service 102 determines that the word is a transliterated or transcribed word. In some embodiments, where a confidence score exceeds the confidence score threshold, the quality control service 102 may determine that the word is a transliterated word from the language that corresponds to the feature model used to determine the confidence score. Where two or more confidence scores exceed the confidence score threshold, the quality control service 102 may determine the language that the word was most likely transliterated from based on a comparison between the two or more confidence scores. Alternatively, the quality control service 102 may determine that the word is a transliterated word from one of the two or more languages associated with the feature models used to determine the confidence scores. For example, the quality control service 102 may present each of the languages associated with the two or more confidence scores, along with a corresponding likelihood that the word has been transliterated from each of the languages.

If the answer at operation 612 is "no" (it is determined that no confidence scores exceed the confidence score threshold), then the process 600 moves to an operation 616 where the quality control service 102 determines that the word is not a transliterated or transcribed word. Alternatively, when no confidence scores exceed the confidence score threshold, the quality control service 102 may determine that the word is a transliterated word from a language and/or alphabet that it has not been trained for.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computing system for identifying transliterated words comprising:
   one or more processors; and
   memory storing computer-executable instructions executable by the one or more processors to perform operations comprising:
      training a classifier, wherein the training comprises:
         accessing a training corpus associated with a language, the training corpus comprising at least an electronic document associated with the language;
         determining features of the training corpus, wherein the features include one or more trigrams present in at least a first word from a first portion of text in the training corpus;
         determining characteristics of the features of the training corpus; and
         generating a feature model for the language based on the features of the training corpus, wherein the feature model comprises a vector embedding of trigram characteristics for the language and a random forest classifier; and
      applying the classifier to a second word from a second portion of text, wherein the applying comprises:
         determining one or more potential typographical errors in the second portion of text;
         performing a false positive search on the one or more potential typographical errors;
         determining that the one or more potential typographical errors include at least one false positive;
         determining one or more trigrams present in the second word in response to determining that the one or more potential typographical errors include the at least one false positive;
         determining, based at least in part on the feature model and the one or more trigrams present in the second word, a confidence score indicative of a likelihood that the second word is a transliterated word, wherein determining the confidence score comprises applying a negative weight to at least one trigram of the one or more trigrams present in the second word based at least in part on a negative correlation between the at least one trigram and the language;
         determining that the confidence score meets or exceeds a confidence score threshold; and
         determining, based on the confidence score meeting or exceeding the confidence score threshold, that the second word is transliterated.

2. The computing system as recited in claim 1, wherein the electronic document is a first electronic document, and the operations further comprise determining one or more potential typographical errors in a second electronic document, wherein the one or more potential typographical errors includes the second word.

3. The computing system as recited in claim 1, wherein the characteristics of the features include at least one of:
   a distribution of trigrams in the training corpus;
   one or more associations between the trigrams in the training corpus; or
   one or more trigram patterns occurring in the training corpus that are correlated with the language.

4. The computing system as recited in claim 1, wherein the language is a first language, and training the classifier further comprises:
   accessing a second training corpus associated with a second language, the second training corpus comprising at least a second electronic document associated with the second language;
   determining second features of the second training corpus, wherein the second features comprise one or more second trigrams present in a third word in the second training corpus;
   determining second characteristics of the second features of the second training corpus; and
   generate a second feature model for the second language based on the second features of the second training corpus.

5. The computing system as recited in claim 4, wherein the confidence score is a first confidence score, and the operations further comprise:
   determining, based on the second feature model, a second confidence score indicative of a second likelihood that the second word is a transliterated word of the second language, and
   determining, based on the first confidence score and the second confidence score, that the second word is a transliterated word of the first language.

6. The computing system as recited in claim 1, wherein the confidence score is one of multiple confidence scores, each of the multiple confidence scores including a value being indicative of a likelihood that the second word is a transliterated word.

7. A computer-implemented method comprising:
   training a classifier, wherein the training comprises:
      accessing a training corpus associated with a language, the training corpus comprising a first electronic document associated with the language;
      determining one or more features of the training corpus, wherein the one or more features comprise one or more n-grams present in a first portion of text in the training corpus;
      determining one or more characteristics of the one or more features of the training corpus; and
      generating a feature model for the language based at least in part on the one or more features of the training corpus, the feature model comprising a vector embedding of n-gram characteristics for the language and a random forest classifier; and
   applying the classifier to a second electronic document, wherein the applying comprises:
      determining one or more potential typographical errors in a second portion of text that is associated with the second electronic document;
      performing a false positive search on the one or more potential typographical errors;
      determining that the one or more potential typographical errors includes at least one false positive;
      determining one or more n-grams present in the second portion of text that is associated with the second electronic document in response to determining that the one or more potential typographical errors includes the at least one false positive; and determining, based at least in part on the feature model, a confidence score indicative of a likelihood that the second portion of text includes at least one transliterated word, wherein determining the confidence score comprises applying a negative weight to at least one n-gram of the one or more n-grams present in the second portion of text based at least in part on a negative correlation between the at least one n-gram and the language.

8. The computer-implemented method of claim 7, wherein the feature model further comprises an algorithmic model that probabilistically determines a native language of a portion of text based at least in part on n-grams present within the portion of text.

9. The computer-implemented method of claim 7, wherein determining the confidence score comprises:
   determining a vector representation of the one or more n-grams present in the second portion of text;
   determining one or more vector points for the one or more n-grams present in the second portion of text based at least in part on the vector representation; and
   determining the confidence score based at least in part on the one or more vector points.

10. The computer-implemented method of claim 7, wherein the second portion of text corresponds to a potential typographical error of the one or more potential typographical errors.

11. The computer-implemented method of claim 7, wherein the one or more characteristics of the one or more features include at least one of:
   a distribution of n-grams in the training corpus,
   one or more associations between n-grams in the training corpus, and
   one or more n-gram patterns occurring in the training corpus that are correlated with the language.

12. The computer-implemented method of claim 7, wherein the feature model identifies at least:
   the negative correlation between the at least one n-gram and the language, and
   a positive correlation between a second n-gram and the language.

13. The computer-implemented method of claim 7, wherein the language is a first language, the confidence score is a first confidence score indicative that the second portion of text includes a transliterated word of the first language, and the method further comprise:
   determining, based on a second feature model for a second language, a second confidence score indicative of a likelihood that the second portion of text includes a transliterated word of the second language, and
   determining, based on the first confidence score and the second confidence score, that the second portion of text includes a transliterated word of the first language.

14. A computing system comprising:
   one or more processors; and
   memory storing one or more computer-executable instructions that are executable by the one or more processors to perform operations comprising:
      training a first feature model to classify one or more first n-grams in a first language, the first feature model comprising a vector embedding of one or more first n-gram characteristics for the first language and a random forest classifier;
      training a second feature model to classify one or more second n-grams in a second language;
      determining one or more potential typographical errors in a portion of text;
      performing a false positive search on the one or more potential typographical errors;
      determining that at least one word of the one or more potential typographical errors qualifies as a false positive;
      determining one or more third n-grams present in the at least one word from the portion of text;
      determining, based at least in part on applying the first feature model to the at least one word, a first confidence score indicative of a first likelihood that the at least one word is a first transliterated word of the first language;
      determining, based at least in part on applying the second feature model to the at least one word, a second confidence score indicative of a second likelihood that the at least one word is a second transliterated word of the second language, wherein the second feature model applies a negative weight to at least one second n-gram of the one or more second n-grams based at least in part on a negative correlation between the at least one second n-gram and the second language; and
      determining, based at least in part on the first confidence score and the second confidence score, that the at least one word is the first transliterated word of the first language.

15. The computing system as recited in claim 14, wherein determining that the at least one word is the first transliterated word of the first language comprises comparing the first confidence score to a preset threshold value.

16. The computing system as recited in claim 14, wherein the training the first feature model comprises:
   accessing a training corpus associated with the first language, the training corpus comprising an electronic document associated with the first language;
   determining one or more features of the training corpus, wherein the one or more features comprise one or more fourth n-grams present in a first word in the training corpus;
   determining, based at least in part on the one or more features of the training corpus, one or more first characteristics of the one or more first n-grams in the first language; and
   generating the first feature model based at least in part on the one or more first characteristics.

17. The computing system as recited in claim 16, wherein the one or more first characteristics include at least one of:
   a distribution of n-grams in the training corpus;
   one or more associations between the n-grams in the training corpus; or
   one or more n-gram patterns occurring in the training corpus that are correlated with the first language.

18. The computing system as recited in claim 16, wherein determining the first confidence score comprises:
   determining a vector representation of the one or more third n-grams present in the at least one word, and
   determining the first confidence score based at least in part on the vector embedding and the vector representation.

19. The computing system as recited in claim 14, wherein the first feature model is an algorithmic model that probabilistically determines a native language of the at least one word based on the one or more third n-grams present within the at least one word.

20. The computing system as recited in claim 14, wherein the second feature model comprises an algorithmic model that probabilistically determines a native language of the portion of text based at least in part on n-grams present within the portion of text.

* * * * *